United States Patent
Hsu et al.

(10) Patent No.: US 8,121,159 B2
(45) Date of Patent: Feb. 21, 2012

(54) TEMPERATURE COMPENSATION METHOD FOR LASER POWER OF AN OPTICAL DISK DRIVE

(75) Inventors: Chia-Hsing Hsu, Taoyuan (TW); Yi-Long Hsiao, Taoyuan (TW)

(73) Assignee: Quanta Storage Inc., Taoyuan County (TW)

( * ) Notice: Subject to any disclaimer, the term of this patent is extended or adjusted under 35 U.S.C. 154(b) by 546 days.

(21) Appl. No.: 12/289,120

(22) Filed: Oct. 21, 2008

(65) Prior Publication Data

US 2009/0135867 A1 May 28, 2009

(30) Foreign Application Priority Data

Nov. 23, 2007 (TW) ............................... 96144702 A

(51) Int. Cl.
*H01S 3/04* (2006.01)
(52) U.S. Cl. ............... 372/34; 372/29.011; 372/29.021; 372/33
(58) Field of Classification Search ............. 372/29.011, 372/29.021, 33, 34
See application file for complete search history.

(56) References Cited

U.S. PATENT DOCUMENTS

| 6,400,737 B1* | 6/2002 | Broutin et al. .................. 372/20 |
| 2005/0078721 A1* | 4/2005 | Wu et al. .................... 372/38.01 |
| 2006/0108517 A1* | 5/2006 | Draper et al. ................. 250/238 |

* cited by examiner

*Primary Examiner* — Yuanda Zhang
(74) *Attorney, Agent, or Firm* — Bacon & Thomas, PLLC

(57) ABSTRACT

A temperature compensation method for laser power in an optical disk drive is provided. A predetermined linear-fitting power curve and a temperature-changing slope curve are previously stored in the optical disk drive. Firstly, an output of laser power is controlled according to the predetermined linear-fitting power curve to read/write data. Next, the temperature of the disk drive is detected. Then, whether the temperature has changed is checked. If the temperature has not changed, the method continues to read/write data. If the temperature has changed, the method obtains a relative slope from the slope curve by use of the temperature of the disk drive, displaces the slope of the predetermined linear-fitting power curve with the obtained relative slope to form a new linear-fitting power curve for replacing the predetermined linear-fitting power curve, and controls the output of laser power.

9 Claims, 3 Drawing Sheets

TEMPERATURE COMPENSATION METHOD FOR LASER POWER OF AN OPTICAL DISK DRIVE

This application claims the benefit of Taiwan application Serial No. 96144702, filed Nov. 23, 2007, the subject matter of which is incorporated herein by reference.

BACKGROUND OF THE INVENTION

1. Field of the Invention

The invention relates in general to an optical disk drive, and more particularly to a temperature compensation method for laser power of an optical disk drive when temperature changes.

2. Description of the Related Art

Optical disk drive, which employs laser diode as the light source, must have stable laser power so as to emit a quality light beam to read, write, or erase data of the optical disc. Laser diode is very sensitive to temperature, and temperature change will change the wavelength of the light emitted by laser diode and make the laser power difficult to maintain stable, hence affecting the quality of reading/writing data by the optical disk drive.

Referring to FIG. 1, a laser power curve of a conventional optical disk drive is shown. In order to stabilize the laser power, the conventional optical disk drive will test the laser power generated by laser diode in the test area of an optical disc by use of different input voltages or input currents. Next, a linear-fitting laser power curve is obtained from several test points according to a curve fitting algorithm. Then, the laser power curve is used as a parameter for the optical disk drive to control the laser diode and emit a light beam with stable laser power, hence maintaining the quality of reading/writing data.

However, the laser power of the optical disk drive will largely change as the temperature of the optical disk drive changes, and the laser power curve disclosed above is merely applicable to the temperature measured when the optical disk drive is tested. As the temperature of the optical disk drive rises when the optical disc drive operates, the laser power is too high or the working environment is heated, the laser power generated by the laser diode will decay, hence affecting the quality of reading/writing data. Another convention optical disk drive has a temperature sensor which detects the temperature of the disk drive, and once the temperature change is over a predetermined value, the optical disk drive will perform new test of laser power to compensate temperature change. However, the implementation of new test not only spends extra time but also reduces the efficiency of the optical disk drive. Therefore, how to tackle with the many problems regarding temperature compensation method for laser power of optical disk drive has become an imminent issue to be resolved.

SUMMARY OF THE INVENTION

The invention is directed to a temperature compensation method for laser power of an optical disk drive is provided. The laser power is compensated to achieve correct output of laser power according to the change in the slope between linear-fitting power curves due to temperature change by obtaining linear-fitting power curves from laser power curves of different temperatures.

According to a first aspect of the present invention, a temperature compensation method for laser power of an optical disk drive is provided. The laser power is compensated in two phases to improve the correctness in the output of laser power by obtaining two-phase linear-fitting power curves from laser power curves of different temperatures by use of a laser power turning point.

To achieve the above objects of the invention, a temperature compensation method for laser power of an optical disk drive is provided. A predetermined linear-fitting power curve and a temperature-changing slope curve of the predetermined linear-fitting power curve are previously stored in an optical disk drive. Firstly, an output of laser power is controlled according to the predetermined linear-fitting power curve to read/write data. Next, the temperature of the disk drive is detected. Then, whether the temperature has changed is checked. If the temperature has not changed, the method continues to read/write data. If the temperature has changed, the method obtains a relative slope from the slope curve by use of the temperature of the disk drive, displaces the slope of the predetermined linear-fitting power curve with the obtained relative slope to form a new linear-fitting power curve for replacing the predetermined linear-fitting power curve, and controls the output of laser power.

The temperature compensation method for laser power of the optical disk drive according to the preferred embodiment of the invention includes the following steps. Firstly, the output of laser power is measured by use of a predetermined temperature and an input voltage. Next, a linear-fitting power curve for controlling an output of laser power is obtained by use of a high phase linear-fitting power curve and a low phase linear-fitting power curve. Next, the low phase linear-fitting power curve is used to control the output of laser power to read/write data. Then, the temperature of the disk drive is detected. Then, whether the output of laser power is smaller than a turning point power is checked. If the laser power is not smaller than the turning point power, the linear fitting power curve is at high phase and is switched to a high phase linear-fitting power curve of the same temperature. If the output of laser power is smaller than the turning point power, the linear fitting power curve is at low phase and maintains the low phase linear-fitting power curve. After that, whether the temperature has changed is checked. If the temperature has not changed, the method continues to read/write data. If the temperature has changed, the temperature of the disk drive is detected, the method obtains a relative slope from the slope curve selected according to the determined phase, displaces the slope of the predetermined linear-fitting power curve with the obtained relative slope to form a new linear-fitting power curve for replacing the predetermined linear-fitting power curve, achieves temperature compensation, and controls the output of laser power.

The invention will become apparent from the following detailed description of the preferred but non-limiting embodiments. The following description is made with reference to the accompanying drawings.

DETAILED DESCRIPTION OF THE INVENTION

The technologies and methods used to achieve the above objects of the invention are exemplified in the following preferred embodiments with accompanying drawings.

Figure 1:
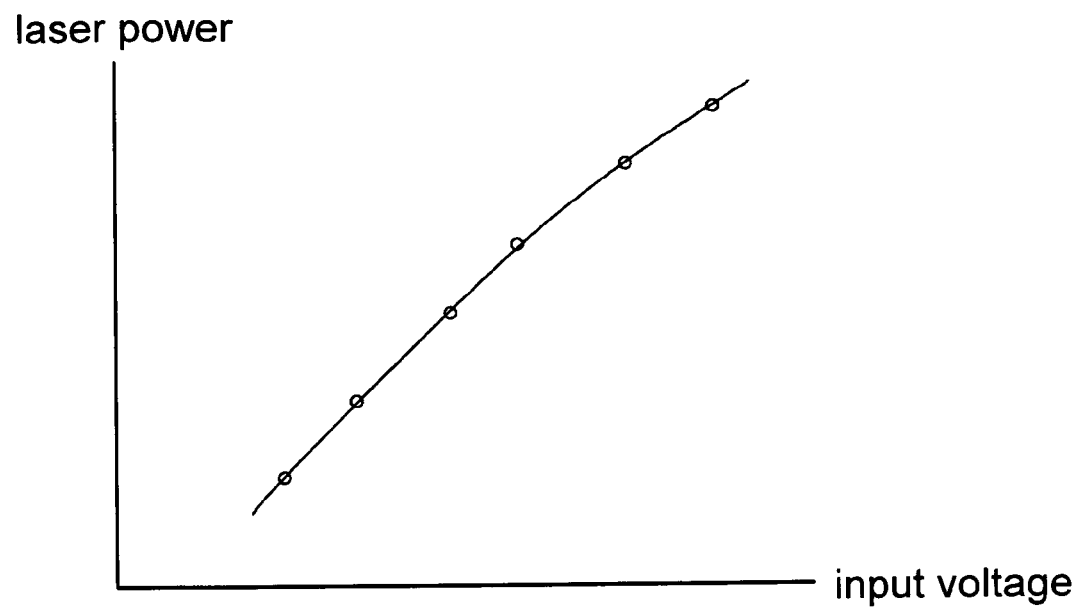
FIG. 1 (Prior Art) shows a laser power curve of a conventional optical disk drive.
Figure 2:
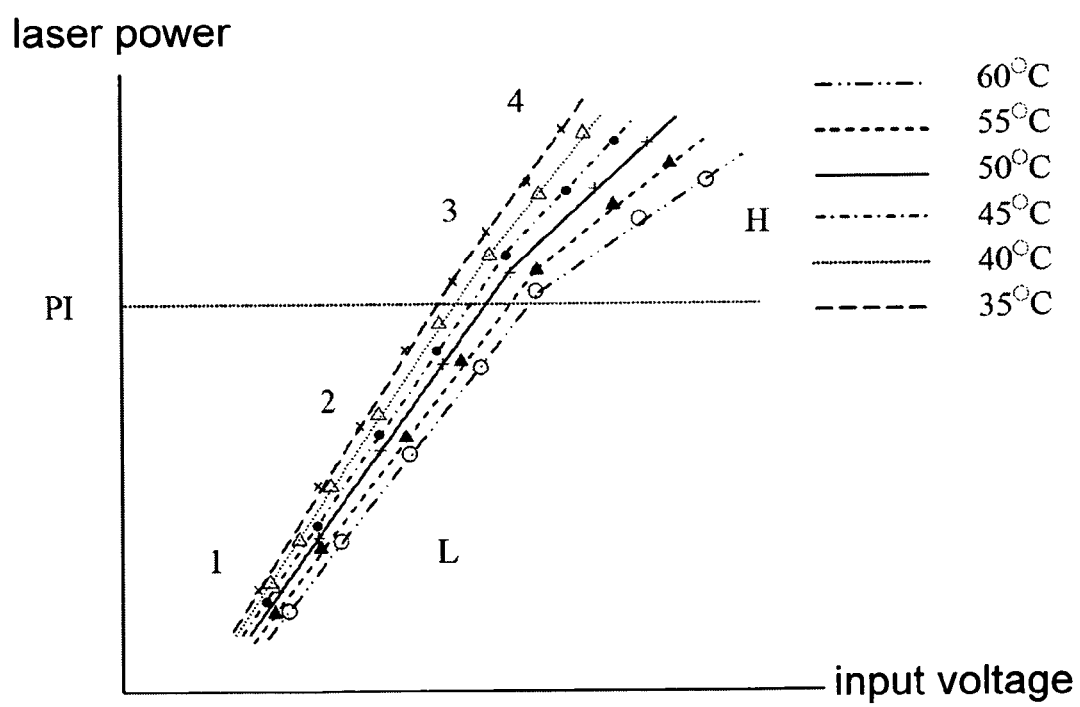
FIG. 2 shows a linear-fitting power curve of a temperature compensation method for laser power according to a preferred embodiment of the invention.

Referring to FIG. 2, a linear-fitting power curve of a temperature compensation method for laser power according to a preferred embodiment of the invention is shown. The invention obtains the optical disk drive linear-fitting power curve by use of practical measuring and curve fitting. Firstly, an optical disc drive is tested at different temperatures. In the present embodiment of the invention, the temperatures 35° C., 40° C., 45° C., 50° C., 55° C., and 60° C. are used as examples. When the optical disk drive is controlled to operate at a particular temperature and a plurality of different voltages (or currents) are respectively inputted to the laser diode, an output of laser power corresponding to each input voltage is detected and the testing result is recorded, and several test points are formed on the coordinate system of output of laser power vs. input voltage. The test points have larger turning at areas where the laser power is very low or very high. Two test points 1 and 2 are selected from the area corresponding to lower laser power and another two test points 3 and 4 are selected from the area corresponding to higher laser power. After a mathematical algorithm for linear fitting is applied to these two pairs of test points, a high phase H linear-fitting power curve for the particular temperature and a low phase L linear-fitting power curve for the particular temperature are respectively obtained. Then, other temperatures at which the optical disk drive operates are sequentially tested, and the two-phase linear-fitting power curve for each temperature is obtained according to the same testing method and the algorithm of two-phase fitting for linear curve. According to the results of the test points, the laser power of each temperature has a larger change as the laser power is near to a particular position, and the laser power at the particular position forms a laser power turning point PI. Thus, the laser power turning point PI, such as 25 mW for example, determines whether the laser power of the optical disk drive adopts high phase H temperature compensation or low phase L temperature compensation.

Figure 3:
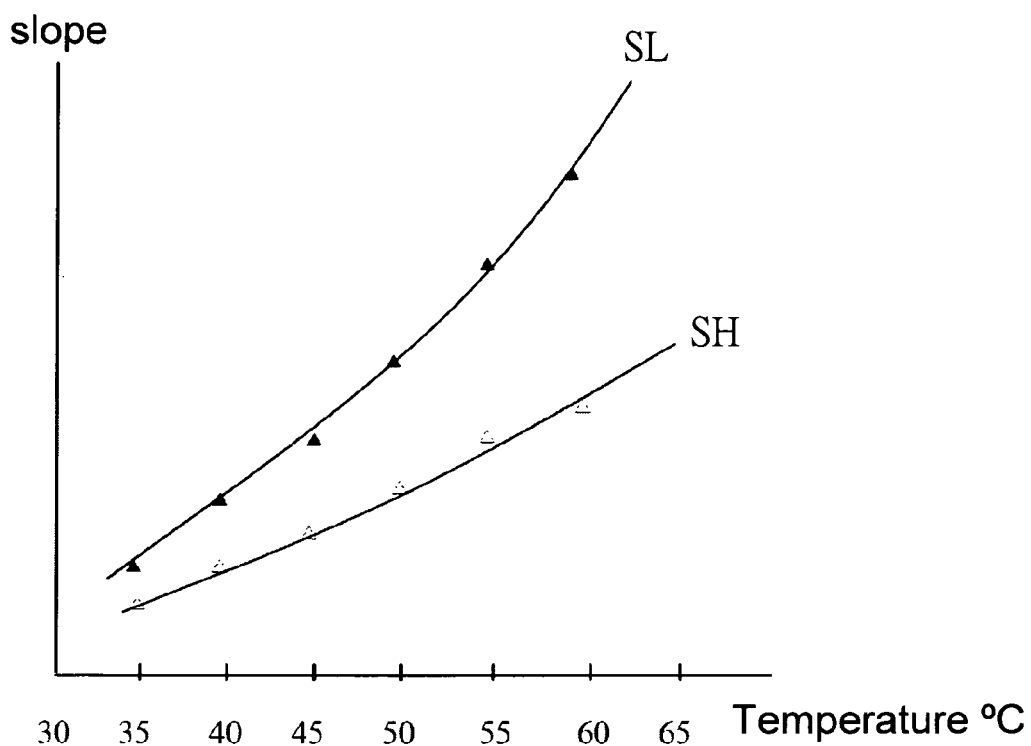
FIG. 3 shows a slope curve of the temperature compensation method for laser power according to the preferred embodiment of the invention.

The high phase H linear-fitting power curve and the low phase L linear-fitting power curve for each temperature are both expressed as a linear equation ay+bx+c=0 wherein the slope being −a/b. Therefore, the slope of the linear-fitting power curve for each temperature can be denoted in a coordinate system of slope vs. temperature as indicated in FIG. 3. Furthermore, the slope of the linear-fitting power curve can be further divided into high phase slope and low phase slope, such that a high phase slope curve SH and a low phase slope curve SL can be obtained respectively by use of curve fitting. Also, the slope of the linear-fitting power curve for other temperatures can also be obtained by use of the interpolation or extrapolation of the high phase slope curve SH and the low phase slope curve SL.

Figure 4:
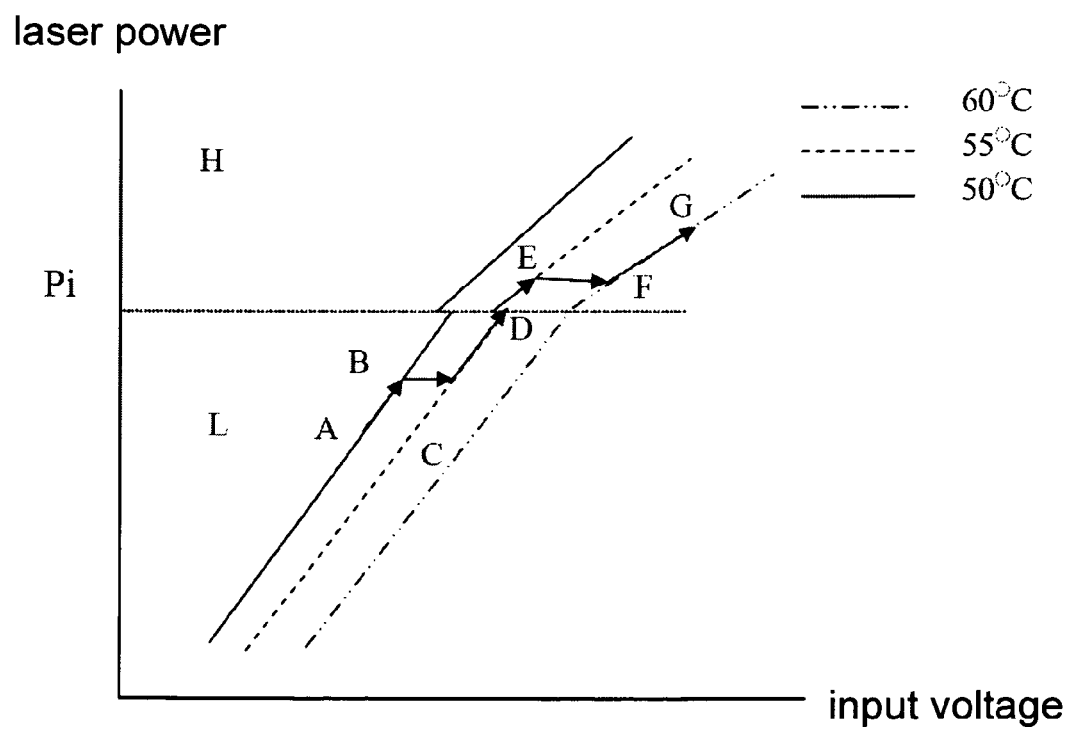
FIG. 4 shows a process of the temperature compensation method for laser power of the optical disk drive according to the preferred embodiment of the invention.

According to the temperature compensation method for laser power of the optical disk drive of the preferred embodiment of the invention, the high phase slope curve and the low phase slope curve as well as the high phase linear-fitting power curve and the low phase linear-fitting power curve obtained when the optical disk drive operates at a constant temperature are previously stored in a memory device of the optical disk drive. As indicated in FIG. 4, a process of the temperature compensation method for laser power of the optical disk drive according to the preferred embodiment of the invention is shown. In the present embodiment of the invention, the optical disk drive operates at temperature 50° C., the slope curve, the laser power turning point PI and the high phase linear-fitting power curve and the low phase linear-fitting power curve for temperature 50° C. are previously stored in a memory device of the optical disk drive. After the optical disk drive activates the laser diode, if the input voltage is inputted from point A and the outputted power is below a laser power turning point PI, the optical disk drive controls the laser power according to the low phase linear-fitting power curve. The optical disk drive moves to point B after having operated for a period of time. Temperature compensation is applied only when the temperature has changed to 55° C. or has reached a predetermined temperature difference. Once temperature change is detected, the optical disk drive obtains a new slope from the low phase slope curve by use of the detected temperature, displaces the slope of the low phase linear-fitting power curve for 50° C. with the obtained relative slope for 55° C. to form a new linear-fitting power curve, and controls the output of laser power.

The optical disk drive moves to point D after having operated for a period of time. Once the laser power is detected to be over the laser power turning point PI, the optical disk drive switches the low phase linear-fitting power curve to the high phase linear-fitting power curve, controls the laser power, and compensates the change in the output of laser power with the high phase linear-fitting power curve of temperature 55° C. The optical disk drive moves to point E after having operated for another period of time. Once temperature change is detected, for example, the temperature changes to 60° C., the optical disk drive obtains a new slope from the low phase slope curve by use of the detected temperature, displaces the slope of the low phase linear-fitting power curve for 55° C. with the obtained relative slope for 60° C. to form a new linear-fitting power curve at point F and outputs correct laser power for temperature compensation so as to complete reading/writing data at point G.

Figure 5:
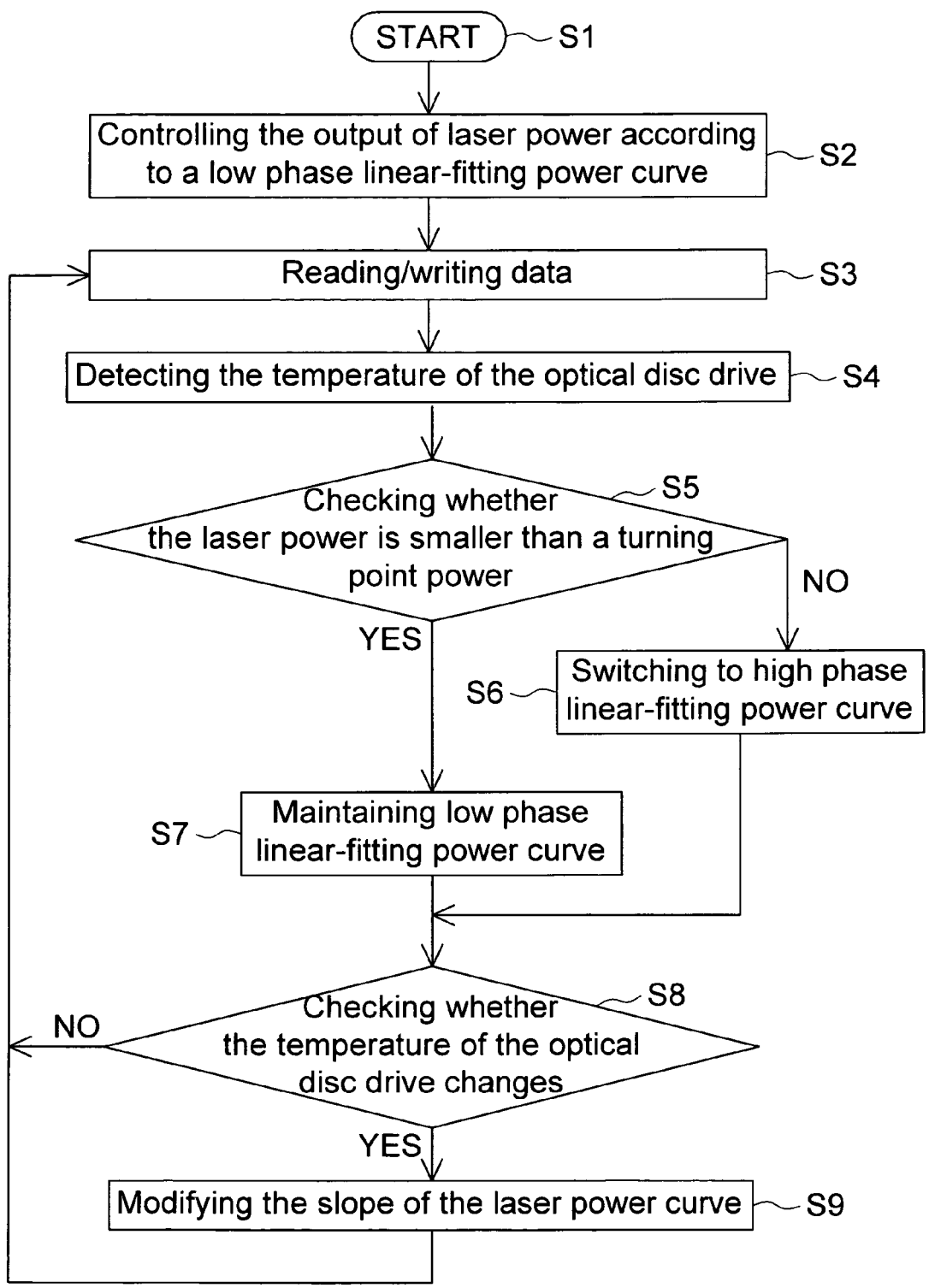
FIG. 5 shows a flowchart of the temperature compensation method for laser power of the optical disk drive according to the preferred embodiment of the invention.

As indicate din FIG. 5, a flowchart of the temperature compensation method for laser power of the optical disk drive according to the preferred embodiment of the invention is shown. The invention provides temperature compensation for the laser power by use of two-phase linear-fitting curve and temperature-changing slope change. Firstly, the method begins at step S1, the optical disk drive is activated. Next, the method proceeds to step S2, the output of laser power is controlled according to a low phase linear-fitting power curve. Then, the method proceeds to step S3, a light beam is emitted to read/write data on the optical disc. After that, the method proceeds to step S4, the temperature of the disk drive is detected. Afterwards, the method proceeds to step S5, whether the output of laser power is smaller than a turning point power is checked. If the output of laser power is not smaller than the turning point power, the optical disk drive is at high phase and the method proceeds to step S6, the low phase linear-fitting power curve is switched to a high phase linear-fitting power curve in controlling the output of laser power, and then the method proceeds to step S8. If the output of laser power is smaller than the turning point power, the optical disk drive is at low phase and the method proceeds to step S7, the low phase linear-fitting power curve maintains controlling the output of laser power, and then the method proceeds to step S8.

Then, the method proceeds to step S8, whether the temperature of the optical disk drive has changed is checked. If the temperature has not changed, the method returns to step S3 and continues to read/write data on the optical disc. That the temperature changes means the temperature of the optical disk drive is different from the temperature of the predetermined linear-fitting power curve or reaches a predetermined temperature difference and this implies that the outputted laser power requires temperature compensation. If the temperature has changed, the method proceeds to step S9, the method obtains a relative slope of linear-fitting power curve from the slope curve previously stored according to the temperature of the optical disk drive detected in step S4 and the current phase whether high or low, displaces the predetermined slope of linear-fitting power curve to form a new predetermined slope of linear-fitting power curve, and controls the output of laser power, and then the method returns to step S3 and continues to read/write data on the optical disc until the reading/writing process is completed.

As disclosed above, the temperature compensation method for laser power of the optical disk drive of the invention achieves correct output of laser power. Firstly, several linear-fitting power curves are formed by applying two-phase linear fitting to the laser power measured when the optical disc drive is at different temperatures. Next, two-phase slope curve is obtained from the slope at each single point of the linear-fitting power curve. Then, the laser power is compensated to achieve correct output of laser power according to the change in the slope between linear-fitting power curves due to temperature change as well as the current phase determined by the laser power turning point. The temperature compensation is exemplified by one high phase linear-fitting power curve and one low phase linear-fitting power curve in the present embodiment of the invention. However, when only the low phase linear-fitting power curve is used in temperature compensation, the temperature compensation can be done by use of one phase power curve fitting and such method already comprises the technology of one phase linear-fitting power curve. The temperature compensation method employing several phase linear-fitting power curves can also be obtained from the temperature compensation method of the present embodiment of the invention and are still within the scope of protection of the invention.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A temperature compensation method for laser power of an optical disk drive, wherein a high phase linear-fitting power curve, a low phase linear-fitting power curve and a temperature-changing slope curve of the high and low phase linear-fitting power curves are previously stored in the optical disk drive, and the method comprises the following steps: (1) controlling an output of laser power according to the low phase linear-fitting power curve to read/write data; (2) detecting the temperature of the optical disk drive and checking the output of laser power, wherein if the output of laser power is not smaller than a turning point power, a linear fitting power curve is at high phase and is switched to the high phase linear-fitting power curve of the same temperature, and wherein if the output of laser power is smaller than the turning point power, the linear fitting power curve is at low phase and maintains at the low phase linear-fitting power curve, and then the method proceeds to the step (3); (3) checking whether the temperature has changed, wherein if the temperature has not changed, the method returns to step (1), and wherein if the temperature has changed, the method proceeds to step (4); and (4) using the temperature of the optical disk drive detected in step (2) to obtain a relative slope from the temperature-changing slope curve and displace the slope of the low phase linear-fitting power curve with the obtained relative slope to form a new linear-fitting power curve for replacing the low phase linear-fitting power curve and then return to step (1).

2. The temperature compensation method for laser power of the optical disk drive according to claim 1, wherein the output of laser power is measured by use of a predetermined temperature and an input voltage, and the new linear-fitting power curve is obtained according to a high phase linear-fitting power curve and a low phase linear-fitting power curve.

3. The temperature compensation method for laser power of the optical disk drive according to claim 2, wherein the temperature-changing slope curve comprises a high phase slope curve and a low phase slope curve respectively formed by a slope change in the high phase linear curve and the low phase linear curve due to temperature change.

4. The temperature compensation method for laser power of the optical disk drive according to claim 3, wherein the high phase slope curve and the low phase slope curve are divided according to the turning point power.

5. The temperature compensation method for laser power of the optical disk drive according to claim 4, wherein the turning point power is set at a position where the high phase slope curve and the low phase slope curve have larger change in the output of laser power.

6. The temperature compensation method for laser power of the optical disk drive according to claim 1, wherein the temperature-changing slope curve used in the step (4) is selected according a phase determined in the step (2).

7. The temperature compensation method for laser power of the optical disk drive according to claim 1, wherein the temperature change in the step (3) is a comparison between a predetermined temperature of a linear-fitting power curve and the detected temperature of the optical disk drive.

8. The temperature compensation method for laser power of the optical disk drive according to claim 7, wherein whether temperature changes is determined according to whether a predetermined temperature difference is reached.

9. The temperature compensation method for laser power of the optical disk drive according to claim 8, wherein the predetermined temperature difference is 5° C.

* * * * *